United States Patent [19]

Angevine et al.

[11] Patent Number: 4,544,542

[45] Date of Patent: Oct. 1, 1985

[54] METHOD FOR OXIDATION OF FLUE GAS DESULFURIZATION ABSORBENT AND THE PRODUCT PRODUCED THEREBY

[75] Inventors: Peter A. Angevine, Ridgefield, Conn.; Sune Bengtsson, Bad Nauheim, Fed. Rep. of Germany; George P. Koudijs, Lijnden, Netherlands

[73] Assignee: Dorr-Oliver Incorporated, Stamford, Conn.

[21] Appl. No.: 600,710

[22] Filed: Apr. 16, 1984

[51] Int. Cl.[4] ............... C01B 17/05; C01F 11/46; C22B 1/243

[52] U.S. Cl. .................... 423/555; 423/242; 106/109; 23/313 FB

[58] Field of Search .......... 23/313 FB; 106/109; 423/242 A, 555

[56] References Cited

U.S. PATENT DOCUMENTS

| | | | |
|---|---|---|---|
| 3,255,036 | 6/1966 | Kramer et al. | 23/313 FB |
| 3,480,387 | 11/1969 | Yasutake et al. | 423/555 |
| 3,563,701 | 2/1971 | Cannon | 423/555 |
| 4,053,375 | 10/1977 | Roberts et al. | 23/313 FB |
| 4,081,513 | 3/1978 | Moss | 423/242 A |
| 4,162,170 | 7/1979 | Grancharov et al. | 106/109 |
| 4,177,158 | 12/1979 | Blue | 423/244 A |
| 4,301,128 | 11/1981 | Hastrup | 423/242 A |

Primary Examiner—John Doll
Assistant Examiner—Robert M. Alway
Attorney, Agent, or Firm—H. M. Snyder; B. J. Kearns; P. D. Greeley

[57] ABSTRACT

A method for treating the fine-grained spend absorbent (primarily calcium sulfite and calcium sulfate) from a dry flue gas desulfurization process. The absorbent, having a small amount of binder therein, is oxidized in a fluidized bed reactor at a temperature in the range from about 700° C. to about 1000° C. to produce a dry essentially fully oxidized pelletized calcium sulfate product.

Calcium sulfate pellets having an average diameter of from about 0.5 mm to 5 mm and containing from about 1% to about 3%, by weight, of binder constituents, are composed of agglomerated calcium sulfate particles having an average diameter of from about $50\mu$ to about $100\mu$ bound to each other by the binder constituents.

19 Claims, 3 Drawing Figures

METHOD FOR OXIDATION OF FLUE GAS DESULFURIZATION ABSORBENT AND THE PRODUCT PRODUCED THEREBY

BACKGROUND OF THE INVENTION

1. Field of the Invention

This invention is directed to a method for oxidizing a flue gas desulfurization waste product to yield a useful end product and to the oxidized product produced by the process.

2. Description of the Prior Art

The combustion of coal in power plants generates large volumes of solid and gaseous pollutants, including fly ash and sulfur dioxide. Sulfur dioxide has been identified as the culprit in acid rain and substantial effort has been directed to reducing or eliminating the amount of sulfur dioxide discharged into the atmosphere by coal-fired boilers. One route taken to accomplish this end is to treat the off-gases of the boiler (the flue gas) to remove the sulfur dioxide therefrom by reacting it with a calcium-containing compound to form calcium-sulfur compounds. These calcium-sulfur compounds have then been disposed of by ponding, if the compounds are in th form of a sludge, or as land-fill if the compounds are dry.

The most common flue gas desulfurization (FGD) process is known as the "wet process." In that process the sulfur dioxide-containing flue gas is scrubbed with a slurry containing calcium hydroxide or another hydrated alkaline absorbent. The scrubbing takes place, for example, in a tower in which the gas flow is countercurrent to and in intimate contact with a stream of descending slurry. The slurry may flow over packing or trays within the tower. The spent slurry product of this FGD process contains both calcium sulfite and calcium sulfate. It has been found to be advantageous to convert the calcium sulfite in the product to calcium sulfate by bubbling air or other oxygen-containing gas through the slurry. Such a process is shown, for example, in U.S. Pat. No. 4,024,220, which issued May 17, 1977. The calcium sulfate product may be used in the production of wall board. Other U.S. patents which disclose various features of the "wet process" are: U.S. Pat. Nos. 4,371,508 4,366,132 4,328,195 4,069,300 4,024,220 3,985,860.

Another type of FGD system produces a dry waste product. A typical dry FGD system comprises: (1) a pre-dust collector for removing fly ash, consisting of an electrostatic precipitator, cyclones or other dedusting equipment; (2) a sulfur scrubbing system, consisting of a liquor preparation system for preparing milk of lime slurry absorbent and a spray drying tower where the absorbent is injected into the flue gas to absorb sulfur dioxide ($SO_2$) and (3) a final dust collecting system.

In the dry process FGD system, sulfur dioxide-containing flue gas is introduced into a spray drier in which a slurry of a lime-containing liquid is sprayed into contact with the flue gas. Reactions occur between the lime and the sulfur dioxide in the flue gas, while the liquid of the slurry is evaporated, yielding an essentially dry powder containing calcium-sulfur compounds. Such a process is shown, for example, in U.S. Pat. No. 4,197,278, which issued Apr. 8, 1980. The dry powder product contains both calcium sulfite and calcium sulfate and it has been suggested that this powder be reslurried and then subjected to oxidation by bubbling air therethrough to convert the calcium sulfite to calcium sulfate in accordance with the teachings of the "wet process" prior art as described above.

As described above, a characteristic of the dry FGD system is that the liquid phase of the fresh absorbent when injected into the spray-drying tower, is very nearly completely evaporated when the flue gas leaves the tower. The dry, spent absorbent of fine-grained particles is first entrained in the desulfurized flue gas and is then partially separated and collected in the bottom section of the spray-drying tower, with the remaining entrained portion removed from the flue gas flow in a final dust-collecting system, usually a bag filter.

The fresh or make-up absorbent is often supplied to the FGD system in dry form (burned lime), where it has to be converted into a liquor, by slaking in water.

The system for preparing and injecting the liquid absorbent comprises:

1. A repulper for mixing the solid absorbent into a liquor or a slurry; and the repulper is often equipped with a screen to take out coarse materials not suspended properly;
2. Pumps for moving the slurry within the system and from the repulper to the spray drying tower, and
3. One or more injection nozzles, mounted on the spray drying tower for dispersing the absorbent liquor into the flue gas stream.

Part of the collected dry, spent absorbent is repulped with the fresh liquor-absorbent to improve the utilization of the absorbent since unreacted absorbent does pass through the spray dryer. This repulping is normally performed in a separate repulping vessel. The recycle ratio is typically 3:1; i.e., three parts of recycled spent absorbent to one part of raw feed.

The following table sets forth typical characteristics of the FGD product of the dry FGD system where milk of lime is used as the absorbent spraying into the flue gas:

TABLE I

| Chemical Composition | Weight % |
| --- | --- |
| $CaSO_3.\frac{1}{2} H_2O$ | 40–70 |
| $CaSO_4.2H_2O$ | 5–15 |
| $CaCO_3$ | 0–10 |
| $Ca(OH)_2$ | 5–15 |
| $CaCl_2.xH_2O$ (x = 1, 2 or 4) | 0–10 |
| Fly ash | 5–25 |

Particle size:
100% smaller than 100 microns (150 mesh)
70–90% smaller than 50 microns The calcuim sulfite is directly formed when milk of lime reacts with gaseous sulfur dioxide. In the temperature range of 70°–150° C., at which a spray-drying tower normally operates in FGD systems, and because of the relatively low oxygen levels of 3–5% in the flue gas, only a small part of the calcium sulfite is oxidized into the sulfate form.

Part of the milk of lime does not react at all (serving as the excess absorbent required for a high percentage removal of $SO_2$), while another part of the milk of lime is carbonated due to the high $CO_2$ level of the flue gas. Most coals also contain some chlorine, which becomes volatile during combustion and which also reacts with the milk of lime in the spray-drying tower forming $CaCl_2$.

The flue gas also contains an entrained fly-ash component which must be dealt with. Fly-ash typically contains the following compounds:

$SiO_2$
$Fe_2O_3$
$Al_2O_3$
$Na_2O+K_2O$

The suggestion has been made in the prior art that the dry calcium sulfite/calcium sulfate-containing powder be oxidized in the dry state and the product obtained thereby, having a high calcium sulfate content, be utilized as an additive for cement or concrete in which it functions as a retardant.

Accordingly, there have been efforts in recent years to develop an oxidation process for treating the dry powder calcium sulfite/calcium sulfate product of the spray drying process of flue gas desulfurization to obtain an oxidized product having a high calcium sulfate content which can be utilized in the known markets. Certain of these efforts are described in the following publications:

West German Application DE No. 3015977 (Holter), published Nov. 11, 1981, is directed to a flue gas desulfurization process and system for treating boiler offgases in which spent absorbent containing a mixture of $CaSO_3$ and $CaSO_4$ is separated from the flue gas and injected into a region of the boiler combustion chamber in which an excess of air is present and the temperature therein is not substantially more than 800° C., and is preferably less than 800° C., to bring about oxidation of $CaSO_3$ to $CaSO_4$.

European patent application No. 74,258 (A/S Niro Atomizer), published Mar. 16, 1983, is directed to a process for treating spent absorbents resulting from desulfurization of flue gas in a spray drying-absorption process, the absorbents containing substantial amounts of sulfite. The sulfite is oxidized into sulfate by heating the spent absorbent in the presence of an oxygen-containing gas at temperatures in the range of 350°-600° C.

West German patent application DE No. 3135200 (L and C Steinmuller GmbH), published Mar. 17, 1983, is directed to a process for the treatment of the end products of flue gas desulfurization, the flue gas desulfurization being effect by absorption of sulfur oxides in a spray drier with a calcium-containing suspension or in a reactor with dry granular calcium-containing absorbent. The end products of the flue gas desulfurization comprise the compounds, calcium sulfite hemihydrate and/or calcium sulfite and/or calcium sulfate dihydrate and/or calcium sulfate hemihydrate and/or calcium sulfate, with the balance the unreacted absorbent Ca-$(OH)_2$. The calcium sulfite-containing end products are treated by dry oxidation with air at temperatures between 400° and 800° C. and, preferably, between 400° and 600° C.

Experience in thermal processing (roasting, calcination) at high temperatures (400°-1000° C.) of various fine grained materials (for example, lime mud, cryolite, pyrites) in fluidized bed reactors has shown that it is sometimes possible to achieve under certain conditions agglomeration sintering of the fine particles into pellets with a diameter of several millimeters.

In U.S. Pat. No. 2,465,410, issued Mar. 29, 1949, there is disclosed a process for calcining lime bearing sludge such as paper mill causticizing sludge, water softening sludge, sludge from first carbonation or other lime sludge producing stations in sugar factories. The sludge solids are provided with a proper quantity of an adhesive substance (soda being an example) which softens and becomes adhesive at elevated temperature to cause particle agglomeration so that the calcined product in in the form of essentially dust-free nodules or pellets.

SUMMARY OF THE INVENTION

Broadly stated, the process of this invention calls for oxidizing a powder-like calcium sulfite material, which is the waste product or spent absorbent of a flue gas desulfurization process, to produce a pelletized calcium sulfate anhydrite product having commercial utility.

As used herein, the term "calcium sulfite material" means the FGD product as received from the spray drying tower of a dry flue gas desulfurization process. It is the reaction product of a milk of lime slurry and sulfur dioxide at a temperature in the range 100°-180° C. and contains calcium sulfite, calcium sulfate and small amounts of other calcium-sulfur compounds, binders and inerts.

In more detail, the powder-like, fine-grained calcium sulfite material containing a small amount (say, 1 to 3% by weight) of relatively low-melting constituents, is subjected to oxidation in a fluidized bed reactor in which air is the fluidizing medium and the operating temperature of the reactor is maintained in the range from 700° to 1000° C. and, preferably, at a temperature over 800° C. At the operating temperature maintained in the reactor, the relatively low-melting or binder constituent of the calcium sulfite material is in the liquid phase and this small amount of sticky molten compounds produces pelletization of the fine-grained spent absorbent.

The process achieves a high oxidation yield of calcium sulfite, and, in addition to the oxidation of calcium sulfite, any calcium sulfide formed by disproportionation (as described hereinafter) is also oxidized to calcium sulfate.

A controlled pelletization is essential: addition of small amounts of low-melting constituents are made to calcium sulfite material deficient in such constituents to assure adequate pelletization. In the case where excessive amounts of low melting constituents are present in the calcium sulfite material, the addition of compounds which react with the binder compounds at the operating temperature of the reactor to form high melting compounds is undertaken to reduce the molten portion of the fluidized calcium sulfite material so that excessive pelletization (lump formation) is avoided. Another method for reducing the binder content of the calcium sulfite material is to employ countercurrent washing of the calcium sulfite material to dissolve out the excess binder present before the oxidation treatment.

When high-melting or low-melting compounds are to be provided for reaction in the oxidation process, they can be added, as described above, directly to the calcium-sulfite material feed, or such compounds may be added to the fresh absorbent liquor before it enters the spray drying tower used in the flue gas desulfurization process.

In order to further promote pelletization, a portion of the pellets produced in the process may be ground to a particle size intermediate that of the spent absorbent raw material and the oxidized pellet product and then fed (recycled) into the fluidized bed reactor with the calcium sulfite feed as nuclei for pelletization.

DESCRIPTION OF THE PREFERRED EMBODIMENTS

Figure 1:
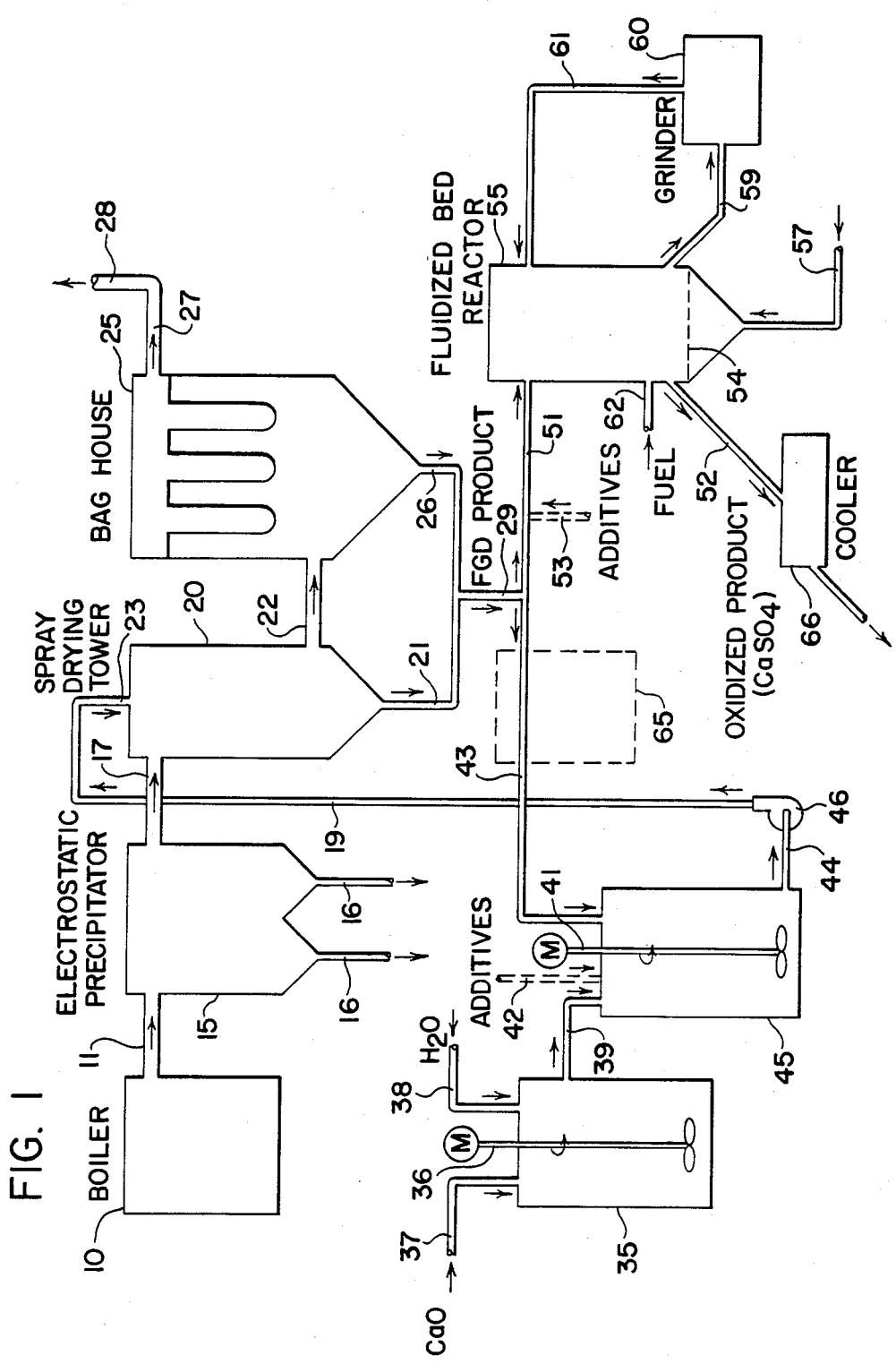
FIG. 1 is a flow chart and block diagram of an FGD system with the added feature of an oxidation system in accordance with the present invention.

In order to make an FGD product acceptable for the building industry, the sulfate content must be the predominant constituent and the amount of other constituents should not fluctuate too widely. These two conditions mean that the fly-ash content must lie in the range between 0 and 10% of the total weight of dry FGD product. Consequently, this requirement means that a pre-dust collector with a collecting efficiency of 80-90% of the total fly-ash in the boiler flue gas, should be installed upstream of the spray-drying tower.

In the absence of a pre-dust collector, the fly-ash content of the dry FGD product could vary between 25 and 200% of the total calcium compounds, which is unacceptable for commercial use in most cement mills.

Normally, boilers operate at flame temperatures above 1200°-1400° C., at which the silica as well as iron and aluminum oxides combine to form a complex compound, similar to the process which takes place in clinker kiln in a cement mill. This means that the compounds in the fly-ash are not available individually but are fixed in the Fe-Al-Si complex compounds.

Pelletization of the fine FGD product is highly desirable for the following reasons:

1. The pelletized product is free flowing and dust free and therefore convenient to handle, store and transport.
2. The pellets will stay in the bed, which is essential to complete oxidation to a high degree.
3. Impurities in the feed often tend to "carryover" (do not pelletize), which improves the product quality.

The basic mechanism for this pelletization is to have a relatively small portion (1-3%) of the fluidized-bed material molten at the operating temperature range. This liquid phase has usually sticky characteristics and therefore can serve as a binding agent for binding the particles together.

The liquid portion of the fluidized bed may consist of pure compounds, having a melting point below the operating temperature; however, it is well known that the melting point of specific mixtures (eutectics) of certain pure compounds can be considerably lower than the melting point of each individual pure component.

Therefore, very small quantities of impurities may have a significant influence and consequently predicting the quantity of bed material in the molten phase at a certain temperature is usually a complicated question. This means that some skill and experimental testwork is required to establish the operating conditions favoring the desired pelletization for a particular product or process.

Satisfactory pelletization is defined as capture of 85 to 95% of the feed material.

Pelletization was immediately apparent in the initial test work done and was found to be a function of chloride content and operating temperature. Good pellet growth was achieved at 600° C. with 4% Cl, 700° C. with 2.6% Cl and 800° C. with 2% Cl.

Impurities and/or inerts in the feed material do not tend to pelletize and are preferentially separated from the product and carried out with the stack gases. This means that large quantities of inerts results in high carryover. The feature of this phenomena is that it improves the purity of the bed product.

The dry FGD product normally contains a varying amount of calcium chloride, dependent on the sulfur/chlorine ratio of the particular coal used.

It was found that if the $CaCl_2$ content of the feed is not sufficient to achieve good pelletization, other compounds having a melting point below 800° C. can serve to make up the balance of the liquid phase required such that the amount of calcium chloride present is less than about 1%, by weight.

Suitable binders are sodium and potassium compounds like $Na_2CO_3$, NaOH (which forms $Na_2CO_3$ in the presence of $CO_2$), $K_2SO_4$ and $K_2CO_3$. Other binding agents worthy of consideration are $Na_2SiO_3$ and $(NH_4)_2SO_4$. While NaCl or KCl can also certainly serve as binders when added to the feed, the chloride content of the pelletized product should be kept low when used in cement, and therefore addition of these chlorides are normally not desired.

As mentioned above, the activity of a portion of the binding agents can also be neutralized by adding a suitable component to the FGD product which reacts with certain binding agents in such a way that compounds with a higher melting point are formed with the chloride being driven off as a vapor. An example of this solution is the addition of silica, which reacts with $CaCl_2$ in the presence of water according to

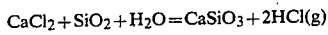

$$CaCl_2 + SiO_2 + H_2O = CaSiO_3 + 2HCl(g)$$

Calcium silicate has a substantially higher melting point then calcium chloride.

It has been found that at temperatures somewhat above 550° C., a significant portion of the sulfite content of the dry FGD product is converted into the sulfate form, but that simultaneously an appreciable amount of sulfide is formed, although almost no sulfide was present in the feed itself. This phenomenon can be explained by the following reaction:

$$4CaSO_3 = 3CaSO_4 + CaS$$

This reaction is well known in the chemical literature as "disproportionation" and takes place in spite of the presence of free oxygen.

The tests showed that virtually all of the sulfites were rapidly converted to either sulfides or sulfates. The problem remaining then, is to oxidize the sulfides, which is more difficult than oxidizing the sulfite. At 600° C., about half of the sulfur appeared to disproportionate.

Figure 3:
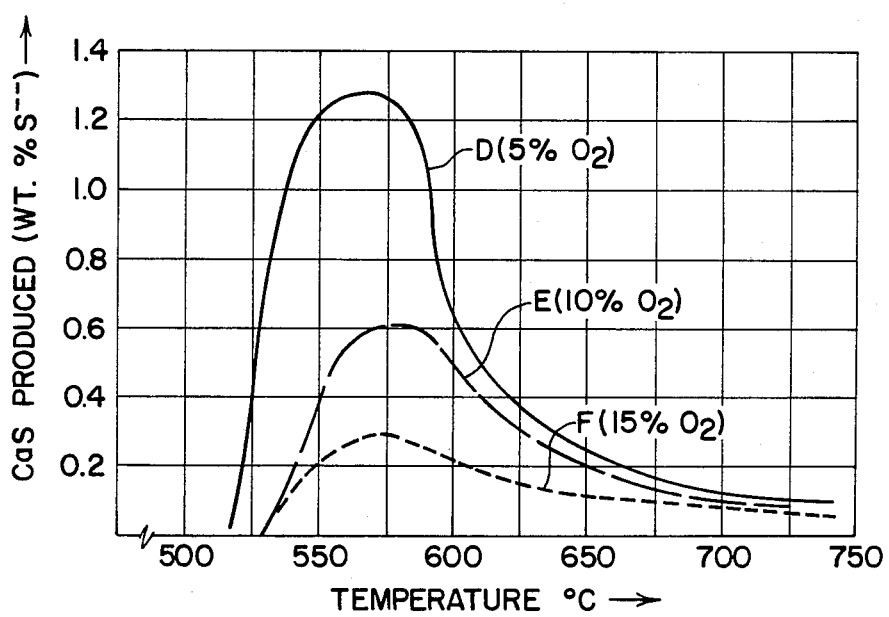

The abovementioned phenomenon is illustrated in the curves of FIG. 3, showing the results of tests with a dry FGD product originally containing 40% $CaSO_3$ and 0% CaS and with a low chloride content which was not sufficient for pelletization. This material was heated for two hours at various temperatures and in various oxygen atmospheres.

FIG. 3 shows that CaS is formed only when the material is heated well above 500° C. and increases initially with increasing temperature. The maximum sulfide content is formed at around 575° C. When heated above 575° C., the CaS content decreases steadily as temperature increases. The same graph shows that the CaS content is lower when oxygen available for reaction is increased; however, it is not commercially attractive to provide more than about 5% excess oxygen.

CaS is an undesired compound in the FGD product. When applied as technical anhydrite in the building industry, it evolves a nuisance odor due to the generation of $H_2S$ when in contact with water; therefore, it is important to minimize the CaS content of the final product.

Figure 2:
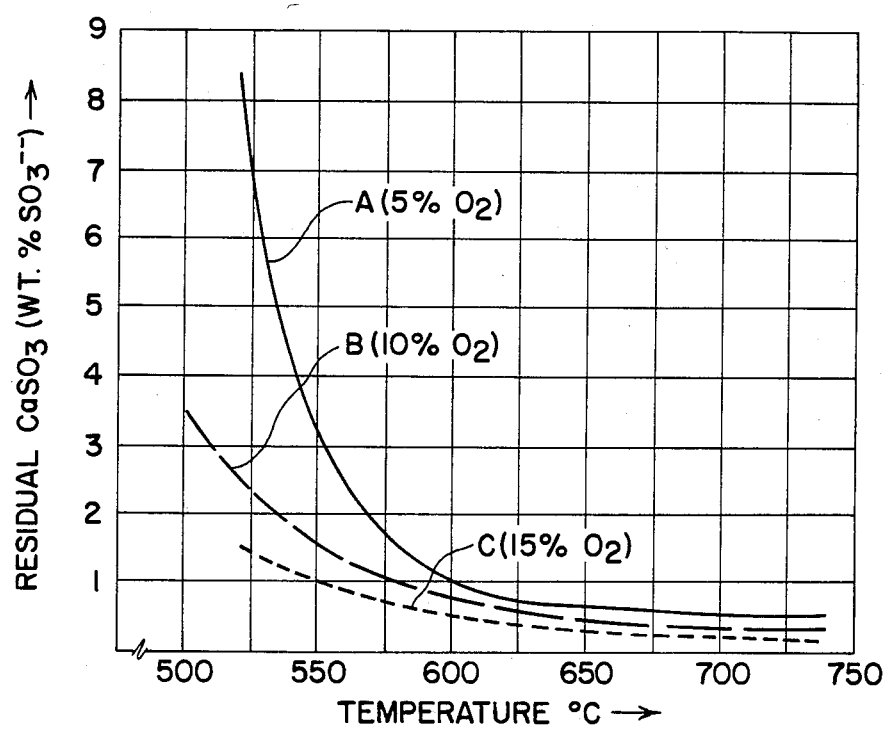
FIG. 2 is a graph comprising a series of curves recording the residual calcium sulfite content of an FGD product undergoing oxidation for a two hour period plotted against temperature at various excess oxygen contents and FIG. 3 is a graph comprising a series of curves recording the calcium sulfide content of an FGD product subjected to oxidation for a two hour period plotted against temperature at various excess oxygen contents.

FIG. 2 shows that the residual $CaSO_3$ content after heating decreases continuously with increasing temperature.

From the above, it can be concluded that the FGD product has to be oxidized at a temperature well above 700° C. to achieve a high oxidation rate (over 95%) and low residual sulfite and sulfide content.

In pilot plant tests it was shown that the oxidation temperature is preferably over 800° C. to produce product pellets which are oxidized at least 95%.

In FIG. 1, the oxidizing system of the invention is shown as applied to treat the FGD product of a system for handling the flue-gas from a coal-burning boiler.

Referring to FIG. 1, the flue-gas generated in boiler 10 passes through conduit 11 to the electrostatic precipitator 15 wherein the fly-ash entrained in the flue-gas in precipitated and removed from the system through outlets 16. The electrostatic precipitator is effective to remove 90–95% of the fly-ash from the flue gas. The relatively dust-free flue-gas passes from the electrostatic precipitator 15 to the spray drying tower 20 through conduit 17. In spray drying tower 20 a slurry of milk of lime, $Ca(OH)_2$, is sprayed through the flue-gas from one or more injection nozzles 23. A reaction occurs at the tower temperature of 100°–180° C. between the milk of lime slurry and the sulfur dioxide, $SO_2$, to form calcium sulfite material (as defined above). A large part of the calcium sulfite material falls to the bottom of spray drying tower 20 and is removed from the spray drying tower through conduit 21. Continuing to follow the path of the flue gas, the gas passes from spray drying tower 20 to bag house 25 through conduit 22. In the bag house 25, the gas is separated from any calcium sulfite material entrained therein and then leaves the bag house through conduit 27 for possible further treatment (not shown) and ultimate discharge through stack 28. The calcium sulfite material (52$\mu$ to 100$\mu$ average diameter) separated in the bag house 25 leaves that unit through conduit 26.

The treatment of the calcium sulfite material, the FGD product, will now be described, referring to FIG. 1. The conduits 21 and 26 discharge their portions of the FGD product flow into line 29 which joins lines 51 and 43. At the juncture of lines 29, 43 and 51, the flow from line 29 is split (by means not shown) so that a portion of the flow passes into line 51 and the remainder into line 43. Line 51 is connected to the fluidized bed reactor 55 and the FGD product introduced thereby forms the bed material thereof. Line 57 introduces a flow of air into the bottom of reactor 55 as the fluidizing medium for the bed which is supported on the constriction plate 54 of reactor 55. Fuel, preferably oil or gas, is introduced through line 62 in an amount sufficient to maintain a temperature in the range from about 700° C. to about 1000° C., preferably above 800° C. In this temperature range, in the presence of the air introduced as the fluidizing medium, the FGD product (calcium sulfite material) is oxidized to calcium sulfate.

In order to control pelletization of the fine grained FGD product in fluidized bed reactor 55, nuclei of a size between that of the fine grained feed and the desired pellets are provided by a grinder 60. Grinder 60 receives pellets formed in the fluidized bed reactor 55 through line 59 and reduces them to the desired size. These nuclei are then returned to the fluidized bed reactor 55 through line 61. In the event that the feed FGD has too much or too little binder material, appropriate additives may be introduced into the feed FGD material through line 53 (in dotted line showing). Thus, $Na_2CO_3$ is added where insufficient binder is present in the feed, whereas silica is added where excessive binder is present to form high melting compounds with some portion of the binder compounds.

The oxidized product pellets (0.5 mm to 5 mm average diameter), composed primarily of calcium sulfate, are withdrawn from the fluidized bed reactor 55 through outlet conduit 52 to a cooler unit 66 to cool the oxidized product pellets to ambient temperature.

That portion of the FGD product which passes from line 29 to line 43 is conducted to the repulper 45. It will be understood that there remains in the FGD product a substantial amount of unreacted calcium compounds. These unreacted compounds are mixed with fresh milk of lime slurry fed through line 39 into repulper 45 in which a stirring element 41 is provided. There is thus a high utilization achieved of the lime addition to the process. From repulper 45 the milk of lime slurry passes through line 44 to pump 46 which pumps the slurry through line 19 to the injection nozzle or nozzles 23 at spray drying tower 20.

It should be noted that additions of the type discussed with reference to line 53 may optionally be made at the point in the process indicated by the dotted line showing 42.

FIG. 1 shows a separate repulper 35 in which the milk of lime slurry is prepared, with burnt lime (CaO) for example, introduced through line 37 while water is introduced through line 38. A stirrer 36 is provided for repulper 35. The milk of lime slurry thus prepared in repulper 35 is passed into repulper 45 through line 39.

One more aspect of the process should be considered with reference to FIG. 1 and that is the situation where excessive chlorides, principally $CaCl_2$, are present in the FGD product. In that case, a washing step may be provided. It may be located in line 43 with the FGD product enroute to repulper 45 being washed in water. The chlorides are highly soluble in water and, accordingly, can be drastically reduced or eliminated from the final product by washing. This washing procedure can be carried out with counter current flows in a set of hydrocyclones, thickeners and filters (specific washing circuit not illustrated).

There has thus been presented a novel process for treating waste absorbent from a dry flue gas desulfurization process to yield a useful and novel end product. Although the present invention has been described in conjunction with preferred embodiments, it is to be understood that modification and variation may be resorted to without departing from the spirit and scope of the invention, as those skilled in the art will readily understand.

We claim:

1. A method for treatment of a particulate fine-grained calcium sulfite material which is the spent absorbent of a flue gas desulfurization process, comprising the steps of:
  (a) Introducing the particulate calcium sulfite material into a fluidized bed reactor as the bed material therefor, the calcium sulfite material having a small amount of low-melting constituents therein, said low-melting constituents being present in an amount of 1% to 3%, by weight;
  (b) Passing on oxygen-containing gas upwardly through the calcium sulfite bed material to fluidize the bed and oxidize said calcium sulfite material to form calcium sulfate;
  (c) Concurrently with step (b), maintaining the bed temperature in the range from 700° C. to 1000° C. to assure that said low-melting constituents are in the liquid phase to agglomerate said calcium sulfate to form pellets; and
  (d) Cooling the oxidized pellets, comprising primarily calcium sulfate, to ambient temperature.

2. The method of claim 1 wherein the amount of calcium chloride present is less than about 1%, by weight.

3. The method of claim 2 wherein the bed temperature is over 800° C.

4. The method of claim 3 wherein the particulate fine-grained calcium sulfite material has an average particle size in the range from about $50\mu$ to $100\mu$.

5. The method of claim 4 wherein the oxidized pellets have an average diameter of from 0.5 mm to 5 mm.

6. The method of claim 4 wherein the oxidized pellets have an average diameter of several millimeters.

7. The method of claim 3 wherein said low-melting constituents are selected from the group consisting of $Na_2CO_3$, $K_2SO_4$, $K_2CO_3$, $Na_2SiO_3$, $(NH_4)_2SO_4$ and $CaCl_2$.

8. The method of claim 1 wherein the amount of low-melting constituents in said calcium sulfite material is brought within the desired range of from about 1% to about 3%, by weight, by the addition of one or more low-melting constituents selected from the group consisting of $Na_2CO_3$, $K_2SO_4$, $K_2CO_3$, $Na_2SiO_3$, $(NH_4)_2SO_4$ and $CaCl_2$, with the $CaCl_2$ component, if present, amounting to less than 1%, by weight; the addition of said low-melting constituents being carried out prior to introduction of the calcium sulfite material into said fluidized bed reactor.

9. The method of claim 1 wherein the amount of low-melting constituents being in excess of the desired range of from about 1% to about 3%, a step of washing the calcium sulfite material in water to dissolve and thus remove excess quantities of low-melting constituents is carried out on at least a portion of the calcium sulfite material prior to its introduction into said fluidized bed reactor.

10. The method of claim 2 wherein a portion of the pellets formed in step (c) of claim 1 are ground to a size intermediate said particulate fine grained calcium sulfite material and said pellets and the ground pellets are returned to the fluidized bed as nuclei for pellet growth.

11. Pellets having a diameter in the range from 0.5 mm to 5 mm composed of agglomerated particles having an average size range of from about $50\mu$ to about $100\mu$ and having binder components therein in an amount from about 1% to about 3%, by weight, with small amounts of impurities and inerts, the balance being essentially calcium sulfate.

12. The pellets of claim 11 wherein the binder components are selected from the group consisting of $Na_2CO_3$, $K_2SO_4$, $K_2CO_3$, $Na_2SiO_3$, $(NH_4)_2SO_4$ and $CaCl_2$.

13. The pellets of claim 12 wherein the $CaCl_2$ component, if present, is in an amount less than 1%, by weight.

14. The pellets of claim 12 wherein the binder component is $Na_2CO_3$.

15. In the dry flue gas desulfurization process wherein the gas is first dedusted to remove fly ash and thereafter is passed through a spray drier in which the gas is subjected to a spray of an absorbent liquid comprising milk of lime, the absorbent reacting with the sulfur dioxide in said gas while the liquid component thereof evaporates, thereby yielding a fine-grained dry spent absorbent composed primarily of calcium sulfite and calcium sulfate, the improvement whereby a useful product is obtained by treating the spent absorbent to produce pellets composed primarily of calcium sulfate, comprising providing the dry spent absorbent with relatively low-melting binder constituents in controlled amounts in the range from about 1% to about 3%, by weight, and oxidizing the absorbent in a fluidized bed reactor at a temperature of from about 700° C. to about 1000° C. at which temperature said binder constituents are in the liquid phase to form oxidized pellets having an average diameter of from about 0.5 mm to about 5 mm composed primarily of calcium sulfate particles having an average diameter of from about $50\mu$ to about $100\mu$ bound to each other by said binder constituents.

16. The process of claim 15 in which said binder constituents are added to the absorbent liquid before said liquid is sprayed in said spray drier.

17. The process of claim 15 in which said binder constituents are added to said fine-grained dry spent absorbent before said absorbent is introduced into said fluidized bed reactor.

18. The process of claim 15 in which the amount of binder constituents is controlled by removing excess binder by washing at least part of said absorbent with water before introducing said absorbent into said spray drier, whereby binder constituents go into solution and can be removed from the process in that form.

19. The process of claim 15 in which the size of pellets produced in said fluidized bed reactor is controlled by providing nuclei of predetermined size on which the particles of calcium sulfate can agglomerate, said nuclei produced by grinding a portion of the pellets formed in the fluidized bed reactor to a size intermediate that of said pellets and said particles of calcium sulfate and recycling said nuclei to said fluidized bed reactor.

* * * * *